United States Patent [19]

Shimizu et al.

[11] Patent Number: 5,354,816

[45] Date of Patent: Oct. 11, 1994

[54] SULFONATED ANILINE-TYPE COPOLYMER AND PROCESS FOR PRODUCTION THEREOF

[75] Inventors: Shigeru Shimizu; Takashi Saitoh; Tomio Nakamura, all of Yokohama, Japan

[73] Assignee: Nitto Chemical Industry Co., Ltd., Japan

[21] Appl. No.: 996,786

[22] Filed: Dec. 24, 1992

[30] Foreign Application Priority Data

Dec. 27, 1991 [JP] Japan .................................. 3-360226

[51] Int. Cl.$^5$ .................................................. C08L 81/00
[52] U.S. Cl. ................................ 525/535; 525/540; 528/373; 528/391
[58] Field of Search .................. 525/535, 540; 528/391

[56] References Cited

U.S. PATENT DOCUMENTS 5,093,439  3/1992  Epstein et al. ........................ 525/535

Primary Examiner—John Kight, III
Assistant Examiner—Shelly A. Dodson
Attorney, Agent, or Firm—Wegner, Cantor, Mueller & Player

[57] ABSTRACT

Sulfonated aniline-type copolymer and a process for their preparation are disclosed.

These products comprise a water soluble and alcohol soluble copolymer of a compound (A) selected from the group of aniline, N-alkylaniline and phenylenediamine, and aminobenzene sulfonic acid (B); said sulfonated product being a following compound of a general formulae I to V stated in the specification, or a mixture thereof.

Also, process for the sulfonated aniline-type copolymer comprises the steps:

copolymerizing a compound (A) selected from the group of aniline, N-alkyl aniline and phenylene diamine, and aminobenzene sulfonic acid (B) to obtain a copolymer; and sulfonating the thus obtained copolymer with a sulfonating agent.

13 Claims, 2 Drawing Sheets

SULFONATED ANILINE-TYPE COPOLYMER AND PROCESS FOR PRODUCTION THEREOF

BACKGROUND OF THE INVENTION

1. Field of the Invention

This invention relates to a sulfonated aniline-type copolymer and a process for the production thereof. More particularly, this invention provides an electric conductive polymer which is soluble in water or an alcoholic solvent.

The obtained polymer solution may be applied to various kinds of antistatic treatment using a simple method such as a coating, spray or dipping method.

2. Description of the Related Art

A proton-doped polyaniline is well known as an electric conductive polymer, however, the proton-doped aniline has a drawback in the molding step or the processing step owing to the insolubility of almost all solvents.

Under these circumstances, a water soluble sulfonated polyaniline that reveals electric conductivity without the addition of a dopant, as well as a process for the production thereof have been proposed.

Examples of the process for the production of the sulfonated polyaniline are as follows: a process for the production of a sulfonated polyaniline by electrochemically polymerizing an aniline and an m-aminobenzene sulfonic acid (Nihon Kagakukaishi, 1985, 1124; Japanese Unexamined Patent Publication No. 2-166165); a process for the production of a sulfonated polyaniline by chemically polymerizing an aniline and o- or m-aminobenzene sulfonic acid (Japanese Unexamined Patent Publication No. 1-301714 corresponding to U.S. Pat. No. 4,956,441); a method of sulfonating an emeraldine-type polymer (polyaniline) obtained by polymerizing chemically or electrochemically using a conc. sulfuric acid (Japanese Unexamined Patent Publication No. 58-210902 corresponding to EP-96319A); a method of sulfonating using anhydrous sulfuric acid and a triethyl phosphate complex (Japanese Unexamined Patent Publication No. 61-197633) and a method of sulfonating using a fuming sulfuric acid (J. Am. Chem. Soc., 1991, 113, 2665–2671; J. Am. Chem. Soc., 1990, 112, 2800, WO91-06887) and the like.

The first mentioned process (Nihon Kagaku kaishi, 1985, 1124; Japanese Unexamined Patent Publication No. 2-166165) had drawbacks in that the isolating process for the product was complicated because of the formation of the product on the electrode, and because a large number of products were difficult to synthesize.

The present inventors attempted to follow the second-mentioned process (Japanese Unexamined Patent Publication No. 1-301714). Namely, the present inventors carried out the process for the polymerization of aniline and m-aminobenzene sulfonic acid using an ammonium peroxodisulfate, as is described in said publication. It was then found that only about one sulfonic acid group per five repeating units was introduced in the obtained product.

Furthermore, the present inventors carried out the process for sulfonating a polyaniline using a fuming sulfuric acid as was described in Japanese Unexamined Patent Publication No. 61-197633 mentioned above. It was also found that only about one sulfonic acid group per five repeating units was introduced in the obtained product as described in the publication, page 7, because the reaction proceeded in the dispersion state owing to insufficient solubility of the polyaniline with regard to the sulfonating solvent, and there was a problem in that the obtained sulfonated polyanilines, including a small amount of the sulfuric acid group therein, were found to be deficient with regard to electric conductivity and solubility.

Next, when sulfonating a polyaniline with a fuming sulfuric acid, about one sulfonic acid is introduced into two repeating units (J. Am. Chem. Soc., 1991, 113, PP2665–2671; J. Am. Chem. Soc., 1990, 112, 2800).

However, when fully sulfonating polyaniline by means of the above process, it is necessary to add an aniline to an amount of the fuming sulfuric acid, because of insufficient solubility of a polyaniline with regard to the fuming sulfuric acid.

Furthermore, when the amount of fuming sulfuric acid is insufficient, a part of the polyaniline solidifies and is not sulfonated thereon.

Therefore, it is necessary to determine a method of introducing much more sulfonic acid groups into the aromatic ring in order to reveal the electric conductivity and improve solubility without the addition of a dopant to a polymer.

Also, when considering the molding properties, such as a film forming property using a coating and in particular when considering the probability of coating the polymer on both a hydrophic and a hydrophobic substrate material, the obtained polymer should preferably enjoy good solubility with regard to water and alcohol and the like.

However, the prior sulfonated polyaniline has good solubility with regard to water, but has low solubility with regard to alcoholic solvents.

SUMMARY OF THE INVENTION

In view of the problems of the prior art described above, an object of the present invention is to provide a sulfonated aniline-type copolymer and a process for the production thereof, with said copolymer revealing high electric conductivity and enjoying high solubility against water or alcoholic solvents and also enjoying good coating properties.

Another object of the present invention is to provide a new sulfonated polyaniline in which the ratio of a sulfonic acid group introduced into an aromatic ring as an electroconductive polyaniline is high and provide a new process for the production thereof.

The present inventors have conducted research with a view to attain the foregoing objects, and as a result have found the following.

Namely, copolymerizing an aniline compound and an aminobenzene sulfonic acid compound in order to obtain a copolymer in which a sulfonic acid group has been previously introduced is very effective for increasing solubility with regard to the solvent, followed by effecting the process of sulfonation.

Therefore, the present invention relates to a sulfonated aniline-type copolymer that comprises a water soluble and alcohol soluble copolymer of a compound (A) selected from the group of aniline, N-alkylaniline and phenylenediamine, and aminobenzene sulfonic acid (B); said sulfonated product being a following compound of a general formulae I to V, or a mixture thereof:

wherein $R_1$, $R_2$, $R_3$ and $R_4$ are independently selected from the group consisting of hydrogen, methoxy, $C_1$-$C_2$ alkyl and hydroxyl and $SO_3H$, wherein at least one of the $R_1$, $R_2$, $R_3$ and $R_4$ is $SO_3H$;

$R'$ is hydrogen or $C_1$-$C_4$ alkyl, and preferably methyl; x is an arbitrary number from 0 to 1.

The molecular weight of the present copolymer ranges from 300 to 500,000 daltons.

The present invention further relates to a process for the above-mentioned sulfonated aniline-type copolymer product that comprises the following steps:

copolymerizing a compound (A) selected from the group of aniline, N-alkyl aniline and phenylene diamine, and aminobenzene sulfonic acid (B) so as to obtain a copolymer; and sulfonating the thus obtained copolymer with a sulfonating agent.

The term "water soluble" means that a non-solubilized product would not be produced when 1% by weight of a sulfonated aniline-type copolymer is dissolved in 0.1N of an ammonia aqueous solution.

The term "alcohol soluble" means that a non-solubilized product would not be produced when 1% by weight of a sulfonated aniline-type copolymer is dissolved in 0.1N of an ammonia-methanol solution.

DETAILED DESCRIPTION OF THE INVENTION

In this invention, the component (A) is at least one of the compounds selected from the group of aniline, N-alkylaniline and phenylenediamines as mentioned above.

N-alkylaniline herein can be N-methylaniline, N-ethylaniline, N-n-propylaniline, N-iso-propylaniline, N-butylaniline and the like.

Phenylenediamines herein can be phenylenediamine, N-phenylphenylenediamine, N,N'-diphenyl-phenylenediamine, N-aminophenyl-N'-phenyl-phenylenediamine, hydroxydiphenylamine and the like.

Note that the monomer (A) component consisting of aniline, N-alkylaniline and phenylenediamine may be employed in a single form, or in a mixed form.

The use of N-alkylaniline may improve solubility with regard to an alcohol-type solvent and may improve the coating properties with regard to a hydrophobic substrate.

Also, the use of phenylenediamine may improve solubility against water due to the increase in the introduction ratio of the sulfonic acid.

The desired ratio of N-alkylaniline to aniline and (or) phenylenediamine is 0 to 30:100. If the ratio of N-alkylaniline is too high, solubility against water could be lowered, and electroconductivity could deteriorate.

Aniline and phenylenediamine can be employed in a single form respectively, or can be employed as a mixture in which both compounds are mixed in an optional ratio.

Generally, when employing only one component of aniline as a component (A) effecting copolymerization of aniline and aminobenzenesulfonic acids, there is a tendency for the introduction ratio of the sulfonic acid group to decrease.

On the other hand, the use of phenylenediamines such as phenylenediamine, N-phenylphenylenediamine and the like may lead to a high sulfonic acid introduction ratio in proportion to the added amount.

It is possible to employ any one of o-, m-, or p-aminobenzenesulfonic acid and anilinedisulfonic acid as the (B) component of aminobenzenesulfonic acids.

Note that a copolymer of aniline and o-aminobenzene sulfonic acid or m-aminobenzene sulfonic acid is described in the following publications of J. Am. Chem. Soc., 1991, 113, 2667 and Japanese Unexamined Patent Publication No. 1-301714.

However, the present inventors have discerned that aniline and p-aminobenzenesulfonic acid can copolymerize effectively.

Note that this chemical structure is different from that of the prior known straight polymer (having the repeating units of bonding at para-position).

The preferred ratio of the component (A) monomer consisting of aniline, N-alkylaniline and phenylenediamine to the component (B) consisting of aminobenzenesulfonic acids to be polymerized is 100 parts by weight of the component (A) monomer (total amount):-10-500 parts by weight of the component (B) monomer.

Note that the monomer (B) component consisting of o-, m-, and p-aminobenzenesulfonic acid can be employed in a single form, or in a mixed form in an optional ratio thereof.

The present copolymer can be obtained by means of oxidation polymerization with an oxidizing agent in the acidic solvent.

The preferred solvents are water, methanol, ethanol, isopropanol, acetonitrile, methylethylketone, dimethylformamide, dimethylacetoamide and the like. The preferred oxidizing agent is ammonium peroxodisulfate, hydrogen peroxide, and the like.

The ratio to be employed of the oxidizing agent to the monomer is 0.1–10 mol:one mol. The preferred ratio of the oxidizing agent to the monomer is 0.5–5 mol:one mol.

The preferred acids to be employed are, for example, sulfuric acid, hydrochloric acid and p-toluenesulfuric acid or the like and a mixture thereof.

The concentration of the acid is 0.1–5 mol/l, preferable 0.2–3 mol/l. The reaction temperature is preferably not more than 70° C., and more preferably a temperature ranging from −20° C. to 50° C.

Here, the copolymer of aniline and(or) N alkylaniline and aminobenzenesulfuric acids is insufficient in electroconductivity and solubility due to a low introduction rate (10–25%) of a sulfonic acid group with regard to the aromatic ring.

However, the copolymer of phenylenediamine and aminobenzenesulfuric acids enjoys both electroconductivity and solubility due to a high introduction rate (25–40%) of a sulfonic acid group with regard to the aromatic ring.

In this invention, the obtained copolymer is further sulfonated in the solvent or without a solvent.

The copolymer of phenylenediamine and aminobenzenesulfonic acid, and also the copolymer of aniline and(or) N-alkylaniline and aminobenzene sulfonic acid enjoys high solubility with regard to the sulfonating agent and solvent, compared with polyaniline, because the monomer component originally contains sulfonic acid on a part of an aromatic ring, which leads to high operability and a high introduction ratio of a sulfonic acid group.

The preferable sulfonating agent may include conc. sulfuric acid, fuming sulfuric acid, fuming sulfuric acid complex and the like.

When sulfonation is carried out using a conc. sulfuric acid or a fuming sulfuric acid as the sulfonating agent, said sulfonation is preferably carried out without a solvent.

When sulfonation is carried out using a sulfur trioxide or a sulfur trioxide complex as the sulfonating agent, said sulfonation is preferably carried out in a solvent.

Suitable solvents are dimethylformamide, dimethylacetoamide, dimethylsulfoxide, N-methylpyrrolidone, pyridine and the like.

Sulfuric acid or fuming sulfuric acid may be employed in an amount of 1 to 100 g, preferably 5 to 50 g per one gram of copolymer.

The solvent may be employed in an amount of 10 to 300 g, preferably 20 to 200 g per one gram of copolymer.

The reaction temperature is preferably not more than 200° C., and more preferably from 0° to 100° C.

The introduction ratio of a sulfonic acid group into an aromatic ring increases to a level of 40 to 80% in the obtained sulfonation product, which in this invention is suitable.

The molecular weight of the thus obtained sulfonated polyaniline ranges from 300 to 500,000 daltons.

Also, the thus obtained sulfonated polyaniline may be dissolved in water or alcohol such as methyl alcohol, ethyl alcohol and isopropyl alcohol.

Note that the above-mentioned water contains therein a base such as ammonia, alkylamine and the like, or else contains the cation of the above base such as ammonium acetate, ammonium oxalate and the like.

The invention will be understood more readily with reference to the following examples; however these examples are intended to illustrate the invention and do not limit the scope of the invention.

EXAMPLE

Synthesis of the Copolymer

Examples 1–14 (Refer to Tables 1 and 2)

An aminobenzene sulfonic acid and at least one compound selected from the group consisting of aniline, N-alkylaniline and phenylenediamine was dissolved in hydrochloric acid, sulfuric acid or p-toluenesulfonic acid, and the solution of ammonium peroxodisulfate in sulfuric acid or p-toluenesulfonic acid was then added in a dropwise manner.

After the addition of the solution was completed, the reaction mixture was further stirred for a period of time, the reaction product was filtrated, washed with methanol and acetone, and dried to yield the desired copolymer in the form of a powder.

More detailed conditions for the copolymerization reaction were listed in Table 1 and Table 2.

TABLE 1

| Example No. | Monomer Component 1 | Component 2 | AS | Solvent | Oxidizing reagent | Solvent |
|---|---|---|---|---|---|---|
| 1 | Aniline 15 mmol | — | m-AS 15 mmol | 1N—HCl 45 ml | $(NH_4)_2S_2O_8$ 30 mmol | 1N—HCl 30 ml |
| 2 | Aniline 15 mmol | — | p-AS 30 mmol | 1N—HCl 68 ml | $(NH_4)_2S_2O_8$ 45 mmol | 1N—HCl 45 ml |
| 3 | Aniline 13.5 mmol | N-Me Aniline 1.5 mmol | m-AS 15 mmol | 1N—HCl 45 ml | $(NH_4)_2S_2O_8$ 30 mmol | 1N—HCl 30 ml |
| 4 | Aniline 13.5 mmol | N-Pr Aniline 1.5 mmol | m-AS 15 mmol | 1N—HCl 45 ml | $(NH_4)_2S_2O_8$ 30 mmol | 1N—HCl 30 ml |
| 5 | N-Ph PDA 15 mmol | — | p-AS 30 mmol | 1N—HCl 68 ml | $(NH_4)_2S_2O_8$ 45 mmol | 1N—HCl 45 ml |
| 6 | N-Ph$_2$PDA 10 mmol | — | m-AS 25 mmol | 1N—HCl 48 ml | $(NH_4)_2S_2O_8$ 30 mmol | 1N—HCl 30 ml |
| 7 | N-Ph PDA 10 mmol | — | m-AS 40 mmol | 1N—PTS 48 ml | $(NH_4)_2S_2O_8$ 30 mmol | 1N—PTS 30 ml |
| 8 | N-Ph PDA 20 mmol | — | m-AS 40 mmol | 2N—$H_2SO_4$ 146 ml | $(NH_4)_2S_2O_8$ 60 mmol | 2N—$H_2SO_2$ 60 ml |
| 9 | N-Ph PDA 20 mmol | — | m-AS 40 mmol | 2N—$H_2SO_4$ 146 ml | $(NH_4)_2S_2O_8$ 30 mmol | 2N—$H_2SO_4$ 30 ml |
| 10 | N-Ph$_2$PDA 20 mmol | — | O-AS 40 mmol | 2N—$H_2SO_4$ 80 ml | $(NH_4)_2S_2O_8$ 90 mmol | 2N—$H_2SO_4$ 120 ml |
| 11 | N-Ph$_2$PDA 20 mmol | — | O-AS 40 mmol | 2N—$H_2SO_4$ 80 ml | $(NH_4)_2S_2O_8$ 60 mmol | 2N—$H_2SO_4$ 80 ml |
| 12 | N-Ph$_2$PDA 20 mmol | — | O-AS 20 mmol | 2N—$H_2SO_4$ 60 ml | $(NH_4)_2S_2O_8$ 40 mmol | 2N—$H_2SO_4$ 55 ml |
| 13 | Aniline 10 mmol | — | Anilinedi-sulfonic Acid 20 mmol | 2N—$H_2SO_4$ 71.5 ml | $(NH_4)_2S_2O_8$ 30 mmol | 2N—$H_2SO_4$ 30 ml |
| 14 | Hydroxy-diphenyl-Amine 25 mmol | — | O-AS 25 mmol | 2N—$H_2SO_4$ 70 ml | $(NH_4)_2S_2O_8$ 50 mmol | 2N—$H_2SO_4$ 50 ml |

[Note]
AS: Aminobenzene sulfonic acids
N-Me aniline: N-methyl aniline
N-Pr aniline: N-propyl aniline
N-Ph PDA: N-phenylphenylenediamine
N-Ph$_2$ PDA: N,N'-diphenylphenylenediamine
PTS: p-toluenesulfonic acid

TABLE 2

| Example No. | Reaction condition Temp. | Hrs. | Yield | Surface resistance [Ω/□] | Introduction ratio of sulfonic acid group |
|---|---|---|---|---|---|
| 1 | 20° C. | 6 hr | 2.1 g | $1.4 \times 10^{10}$ | 21% |
| 2 | 40° C. | 6 hr | 1.8 g | $4.8 \times 10^{10}$ | 19% |
| 3 | 25° C. | 6 hr | 2.3 g | $1.5 \times 10^{10}$ | 20% |
| 4 | 30° C. | 12 hr | 2.0 g | $2.0 \times 10^{10}$ | 21% |
| 5 | 10° C. | 12 hr | 5.7 g | $2.6 \times 10^{9}$ | 35% |
| 6 | 40° C. | 12 hr | 2.8 g | $1.0 \times 10^{10}$ | 30% |
| 7 | 25° C. | 12 hr | 2.1 g | $1.2 \times 10^{10}$ | 24% |
| 8 | 25° C. | 12 hr | 3.8 g | $3.4 \times 10^{10}$ | 27% |
| 9 | 25° C. | 12 hr | 3.3 g | $2.7 \times 10^{10}$ | 28% |
| 10 | 25° C. | 12 hr | 4.8 g | $5.0 \times 10^{10}$ | 32% |
| 11 | 25° C. | 12 hr | 3.8 g | $7.6 \times 10^{9}$ | 34% |
| 12 | 25° C. | 12 hr | 2.8 g | $6.5 \times 10^{9}$ | 30% |
| 13 | 25° C. | 12 hr | 0.5 g | $6.8 \times 10^{9}$ | 40% |
| 14 | 25° C. | 12 hr | 1.2 g | $2.5 \times 10^{10}$ | 25% |

Sulfonation

Examples 15-17, 20 (Refer to Tables 3 and 4)

2.0 g of the copolymer prepared using the procedure described in the Examples 1 to 6 is added to 90 g of the fuming sulfuric acid, and stirred for 6 hours at a certain temperature to yield the reaction mixture.

The thus obtained reaction mixture was added dropwise to ethyl alcohol to yield the precipitates. The obtained precipitates were filtered off, washed with methanol and acetone, and the washed product were dried to yield sulfonated polyaniline.

Figure 1:
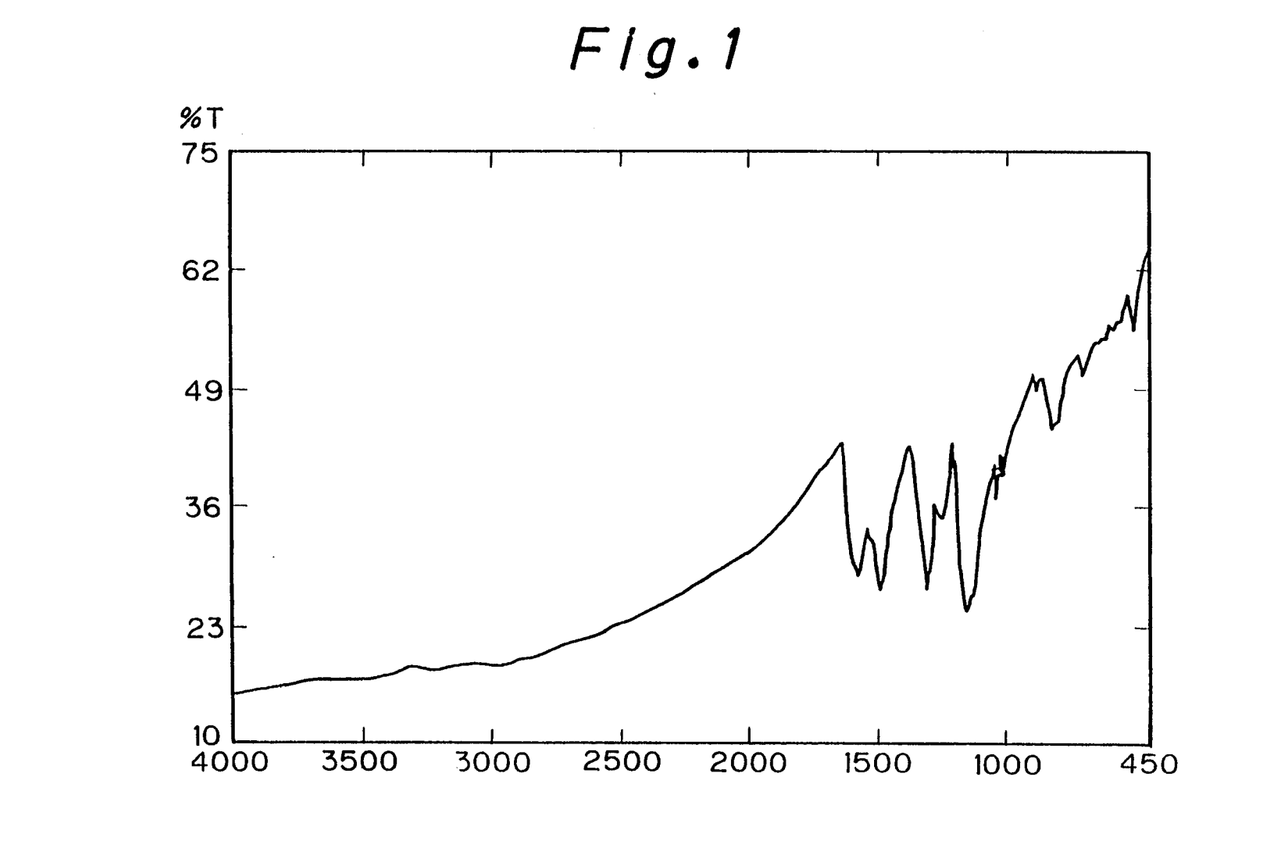
FIG. 1 is a graph illustrating the FT-IR spectra (KBr method) of the present copolymer obtained in Example 2.
Figure 2:
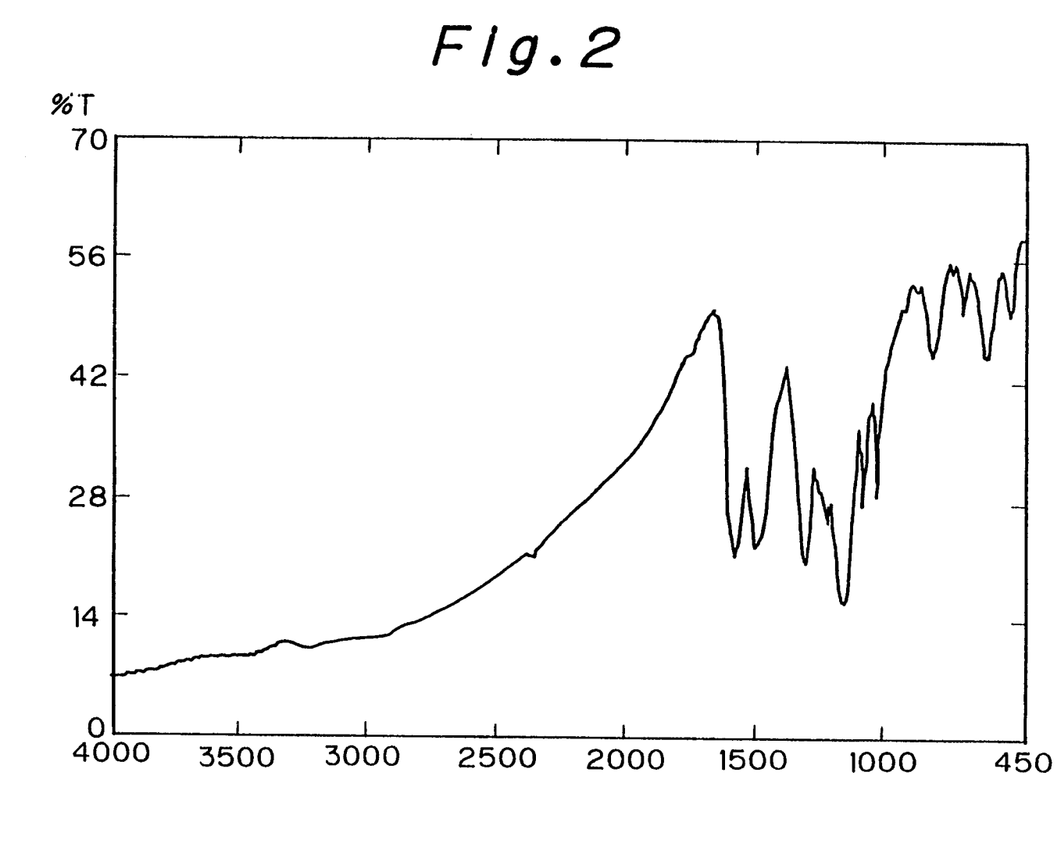
FIG. 2 is a graph illustrating the FT-IR spectra (KBr method) of the present copolymer obtained in Example 8.

FIG. 1 is a graph illustrating the FT-IR spectra (KBr method) of the present copolymer obtained in Example 2, and FIG. 2 is a graph illustrating the FT-IR spectra (KBr method) of the present copolymer obtained in Example 8.

Two peaks band appearing at 1000 to 1100 cm$^{-1}$ in FIGS. 1 and 2 are based on the absorption of the sulfonic acid group. The intensity of this band shown in FIG. 2 is stronger than that in FIG. 1, which demonstrates that the introduction ratio of the sulfonic acid group in Example 8 is higher than that in Example 2.

Example 18 (Refer to Tables 3 and 4)

30 g of sulfur trioxide was added to 200 g of dimethylformamide and stirred for one hour, followed by the addition of 2.0 g of the copolymer prepared by the procedure described in Example 4, and stirred at a temperature of 20° C. for 6 hours to yield the reaction mixture. The thus obtained reaction mixture was added to ethyl alcohol to yield the precipitates. The thus obtained precipitates were filtered off, washed with methanol and acetone, and dried to yield the sulfonated polyaniline.

Example 19 (Refer to Tables 3 and 4)

2.0 g of the copolymer prepared by the procedure described in Example 5 was added to 200 g of sulfuric acid and stirred for 6 hours at a temperature of 70° C. to yield a reaction mixture. The thus obtained reaction mixture was added to ethyl alcohol to yield the precipitates. The obtained precipitates were filtered off, washed with methanol and acetone, and dried to yield a sulfonated polyaniline.

Examples 21 to 28 (Refer to Tables 3 and 4)

0.5 g of the copolymer prepared by the procedure described in Examples 7-14 was added to 50 g of sulfuric acid and stirred for 1-2 hours at a temperature of 100° C. to yield a reaction mixture. The thus obtained reaction mixture was added to ethyl alcohol to yield the precipitates. The obtained precipitates were filtered off, washed with methanol and acetone, and dried to yield a sulfonated polyaniline.

Comparative Example 1

A sulfonated polyaniline was prepared in accordance with the description of J. Am. Chem. Soc., 1991, 113, P2666.

2.0 g of polyaniline was added to 200 g of fuming sulfuric acid. The mixture was stirred into a solution at room temperature and when polyaniline was added, a part of the polymer solidified; thereafter, more than 24 hours was needed for the solution to clear. Methyl alcohol was added to the obtained solution. Next, acetone was added to yield the complete precipitates. The obtained precipitates were filtered off, and washed with methanol and acetone, and then dried in a dynamic vacuum for 5 hours to yield 1.9 g of sulfonated polyaniline. The sulfonated ratio for the sulfonated polyaniline was 42%.

One gram of the product was dissolved in 100 g of 0.1N aqueous ammonia solution, however, some insoluble matter (30% per whole product) was found after filtration of the solution.

The filtrate was coated on a glass substrate to form a thin film. The surface resistance of this film was measured and the formula $7.6 \times 10^{10}$ Ω/□ was obtained.

Also, the above sulfonated polyaniline was dissolved in 0.1N ammonia containing a methanol solution, but insoluble matter was also found.

Comparative Example 2

A sulfonated polyaniline was prepared in accordance with the description of Japanese Unexamined Patent Publication No. 61-197633 (pages 6 to 7).

2.0 g of ethyl phosphate was dissolved in 16 g of 1.2-dichloroethane to yield the solution. 1.8 g of anhydrous sulfuric acid was added to the solution to prepare the sulfonating reagent solution.

1.0 g (11 mmol) of the polyaniline was finely ground into powder form. This powder was added to 1,2-dichloroethane to prepare a dispersion.

The above-mentioned sulfonating reagent solution was added dropwise to the dispersion while being kept cool with ice.

After completion of the said addition, the mixture matured for one hour while being ice-cooled to yield a product.

The product was filtered off, washed with 1,2-dichloroethane and methanol, dried for 8 hrs at 50° C. to yield 1.2 g of sulfonated polyaniline. The introduction ratio of the sulfonic acid group was 17%.

Scarcely one gram of the sulfonated polyanilion was dissolved in 100 g of 0.1N aqueous ammonia solution.

Comparative Example 3

A copolymer of aniline and m-aminobenzenesulfonic acid was synthesized in accordance with the described Example (page 3) in the Japanese Unexamined Patent Publication No. 1-301714.

1.6 g (17 mmol) of aniline and 5.7 g (33 mmol) of m-aminobenzenesulfonic acid were dissolved in 80 ml of 2N were dissolved in 80 ml of 2N sulfuric acid to prepare a solution.

75 ml of a sulfuric acid solution containing 17 g (75 mmol) of ammonium peroxodisulfate was added dropwise to the solution for 0.5 hrs at a temperature of 20° C.

After completion of the said addition, the mixture matured for one hour at a temperature of 20° C. to yield a product.

The product was filtered off, washed with methanol and acetone, and dried for 8 hrs at a temperature of 50° C. to yield 2.5 g of a copolymer.

The introduction ratio of the sulfonic acid group was 22%.

One gram of the thus obtained product was dissolved in 100 g of 0.1N aqueous ammonia solution, however, insoluble matter (70% per the whole product) was found after said filtration of the solution.

The filtrate was coated on a glass substrate to form a thin film. The surface resistance of this film was measured and the formula $3.4 \times 10^{10}$ Ω/□ was obtained.

Also, the above sulfonated polyaniline was dissolved in 0.1N ammonia containing methanol solution, however, insoluble matter was also found.

TABLE 3

| Example No. | Sulfonation | | | Reaction condition | |
|---|---|---|---|---|---|
| | Polymer | Sulfonating reagent | Solvent | Temperature | Hour |
| 15 | Example 1 2.0 g | Fuming sulfuric acid 90 g | — | 5° C. | 6 hr |
| 16 | Example 2 2.0 g | Fuming sulfuric acid 90 g | — | 5° C. | 6 hr |
| 17 | Example 3 2.0 g | Fuming sulfuric acid 90 g | — | 20° C. | 6 hr |
| 18 | Example 4 2.0 g | Sulfur trioxide 30 g | DMF 200 g | 20° C. | 6 hr |
| 19 | Example 5 2.0 g | Fuming sulfuric acid 200 g | — | 70° C. | 6 hr |
| 20 | Example 6 2.0 g | Fuming sulfuric acid 90 g | — | 10° C. | 6 hr |
| 21 | Example 7 0.5 g | Conc. $H_2SO_4$ 50 g | — | 100° C. | 2 hr |
| 22 | Example 8 0.5 g | Conc. $H_2SO_4$ 50 g | — | 100° C. | 2 hr |
| 23 | Example 9 0.5 g | Conc. $H_2SO_4$ 50 g | — | 100° C. | 2 hr |
| 24 | Example 10 0.5 g | Conc. $H_2SO_4$ 50 g | — | 100° C. | 2 hr |
| 25 | Example 11 0.5 g | Conc. $H_2SO_4$ 50 g | — | 100° C. | 2 hr |
| 26 | Example 12 0.5 g | Conc. $H_2SO_4$ 50 g | — | 100° C. | 2 hr |
| 27 | Example 13 0.5 g | Conc. $H_2SO_4$ 50 g | — | 100° C. | 2 hr |
| 28 | Example 14 0.5 g | Conc. $H_2SO_4$ 50 g | — | 100° C. | 2 hr |

DMF: Dimethylformamide

TABLE 4

| Example No. | Yield | Surface resistance [Ω/□] | Introduction ratio of sulfonic acid group | Insoluble matter | |
|---|---|---|---|---|---|
| | | | | Aqueous solvent-type | Alcohol solvent-type |
| 15 | 2.4 g | $1.8 \times 10^9$ | 48% | Non | Non |
| 16 | 2.2 g | $5.0 \times 10^9$ | 43% | Non | Non |
| 17 | 2.5 g | $1.5 \times 10^9$ | 47% | Non | Non |
| 18 | 1.7 g | $2.0 \times 10^9$ | 45% | Non | Non |
| 19 | 1.9 g | $8.7 \times 10^8$ | 54% | Non | Non |
| 20 | 2.3 g | $4.2 \times 10^8$ | 56% | Non | Non |
| 21 | 0.42 g | $6.4 \times 10^8$ | 47% | Non | Non |
| 22 | 0.40 g | $9.6 \times 10^8$ | 42% | Non | Non |
| 23 | 0.40 g | $6.8 \times 10^8$ | 48% | Non | Non |
| 24 | 0.32 g | $8.6 \times 10^7$ | 51% | Non | Non |
| 25 | 0.40 g | $7.0 \times 10^7$ | 47% | Non | Non |
| 26 | 0.34 g | $7.0 \times 10^7$ | 44% | Non | Non |
| 27 | 0.26 g | $8.0 \times 10^7$ | 55% | Non | Non |
| 28 | 0.27 g | $1.8 \times 10^9$ | 40% | Non | Non |

[Note]

Surface resistance after film formation:

Ong gram of the obtained product was dissolved in 100 g of 0.1N aqueous ammonium solution and filtered off. The filtrate was coated on a glass substrate to form a thin film having a thickness of 200 to 500 Å, and the surface resistance of this film was measured.

Method for measurement of the introduction ratio of sulfonic acid group:

The sample was decomposed in a combustion flask, the sulfur-containing ratio was then measured by means of an ion-chromatography method. The introduction ratio of the sulfonic acid group was calculated from the data of the sulfur-containing ratio.

Evaluation Method of Solubility

Sulfonated polyaniline was dissolved in one % by weight of the following solvents (1) and (2); the appearance of the insoluble matter was then observed.

(1) Aqueous solvent-type: Dissolved in 0.1N aqueous ammonium solution.

(2) Alcoholic solvent-type: Dissolved in 0.1N ammonia-methanol solution.

According to the present invention, the introduction ratio of sulfonic acid in the polymer is increased, and electroconductivity is improved without the addition of a dopant and further, solubility w/r to water and alcohol is enhanced.

Therefore, when forming a thin film on the substrate by means of a coating, spray method, dipping and the like, using a solvent containing the present polymer, it is possible to obtain a uniform and high electroconductive thin film that does not have any pin holes.

We claim:

1. A process for preparing a sulfonated copolymer which comprises copolymerizing (A) a compound selected from the group consisting of an aniline compound, an N-alkyl aniline compound a phenylenediamine compound and mixtures thereof with (B) an aminobenzenesulfonic acid compound to obtain a first sulfonated copolymer; and further sulfonating the thus obtained first sulfonated copolymer with a sulfonating agent.

2. A process for preparing a sulfonated copolymer as in claim 1 wherein the first sulfonated copolymer is a compound selected from the group consisting of:

-continued and mixtures thereof; wherein $R_1$, $R_2$, $R_3$ and $R_4$ are independently selected from the group consisting of hydrogen, methoxy, $C_1$-$C_2$ alkyl hydroxyl and sulfonic acid, wherein at least one of the $R_1$, $R_2$, $R_3$ and $R_4$ is sulfonic acid; R' is hydrogen or $C_1$-$C_4$ alkyl; x is a number from 0-1.

3. A process for preparing a sulfonated copolymer as in claim 2 wherein R' is methyl.

4. A process for preparing a sulfonated copolymer as in claim 2 wherein a sulfonic acid is incorporated into an aromatic ring of the first sulfonated copolymer in a ratio of from 40 to 80 percent.

5. A process for preparing a sulfonated copolymer as in claim 2 wherein the molecular weight of the first sulfonated copolymer ranges from 300 to 500,000 daltons.

6. A process for preparing a sulfonated copolymer as in claim 1 wherein the phenylenediamine compound is a compound selected from the group consisting of phenylenediamine, N-phenylphenylenediamine, N,N'-diphenylphenylenediamine, N-aminophenyl-N'-phenyl-phenylenediamine and hydroxydiphenylamine.

7. A process for preparing a sulfonated copolymer as in claim 1 wherein the aniline compound is a compound selected from the group consisting of aniline and phenylenediamine.

8. A process for preparing a sulfonated copolymer as in claim 1 wherein the N-alkylaniline compound is a compound selected from the group consisting a N-methylaniline, N-ethylaniline, N-n-propylaniline, N-iso-propylaniline and N-butylaniline.

9. A process for preparing a sulfonated copolymer as in claim 1 wherein the aminobenzenesulfonic acid compound is a compound selected from the group consisting of o-aminobenzenesulfonic acid, m-aminobenzenesulfonic acid, p-aminobenzenesulfonic acid and anilinedisulfonic acid.

10. A process for preparing a sulfonated copolymer as in claim 1 wherein the mixture of the N-alkyl aniline compound and the aniline compound have a ratio of 0 to 30:100.

11. A process for preparing a sulfonated copolymer as in claim 1 wherein the aniline, N-alkylaniline, or phenylenediamine compound is in a ratio to the aminobenzenesulfonic acid compound of 100:10–500 parts by weight.

12. A process for preparing a sulfonated copolymer as in claim 1 wherein copolymerizing occurs by oxidation polymerization with an oxidizing agent in an acid solvent.

13. A process for preparing a sulfonated copolymer as in claim 1 wherein the sulfonating agent is a compound selected from the group consisting of a concentrated sulfuric acid, a fuming sulfuric acid, a fuming sulfuric acid complex and a sulfur trioxide.

* * * * *